United States Patent [19]

Hipp et al.

[11] 4,208,161
[45] Jun. 17, 1980

[54] DEVICE FOR RELEASABLY SECURING A VEHICLE TO AN ADJACENT SUPPORT

[75] Inventors: Steven J. Hipp, Milwaukee; Norbert Hahn, Cudahy, both of Wis.

[73] Assignee: Rite-Hite Corporation, Cudahy, Wis.

[21] Appl. No.: 911,053

[22] Filed: May 30, 1978

[51] Int. Cl.² .............................................. B65G 67/02
[52] U.S. Cl. .................................................... 414/401
[58] Field of Search ................ 414/396, 401, 402, 584

[56] References Cited

U.S. PATENT DOCUMENTS

| 1,418,966 | 6/1922 | Perin | 414/401 X |
| 2,693,284 | 11/1954 | Gerhardt | 414/584 X |
| 3,250,408 | 5/1966 | Daniluk et al. | 414/401 X |

Primary Examiner—Robert G. Sheridan

Attorney, Agent, or Firm—Neuman, Williams, Anderson & Olson

[57] ABSTRACT

A device is provided for use in releasably securing a vehicle against a loading dock during loading and unloading of the vehicle. The device comprises a hingedly mounted vehicle-engaging member located adjacent a front wall of the dock and beneath the plane of the dock loading surface. A handle is provided for effecting controlled movement of the member between an inoperative mode and an operative mode. When in an operative mode, a portion of the member interlocks with a component of the vehicle and restrains movement of the vehicle away from the loading dock. When in an inoperative mode, the member assumes a vehicle-release position wherein the vehicle is free to move away from the loading dock.

9 Claims, 11 Drawing Figures

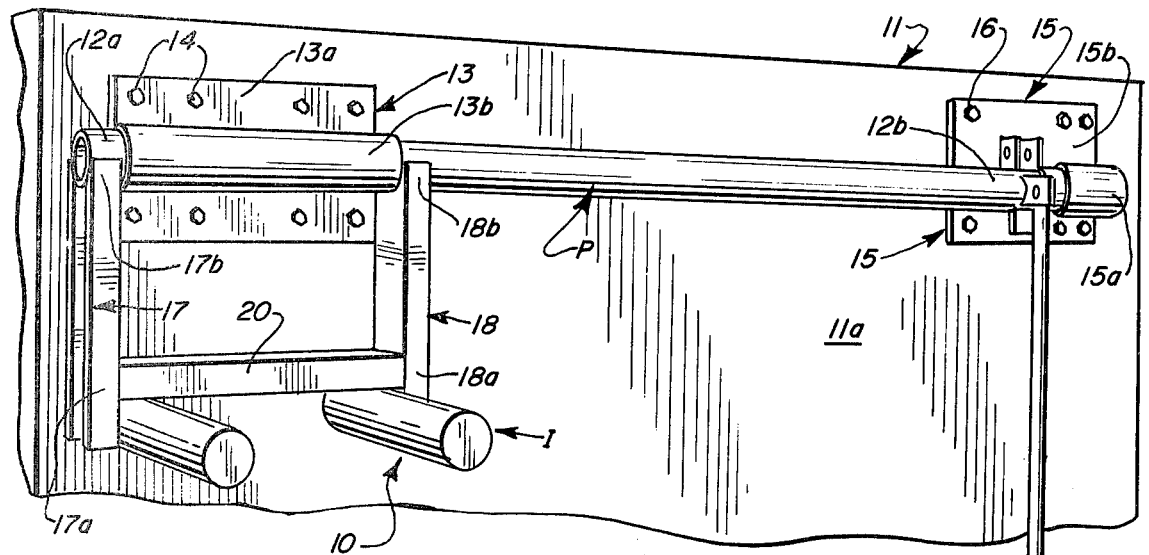
FIG. 1
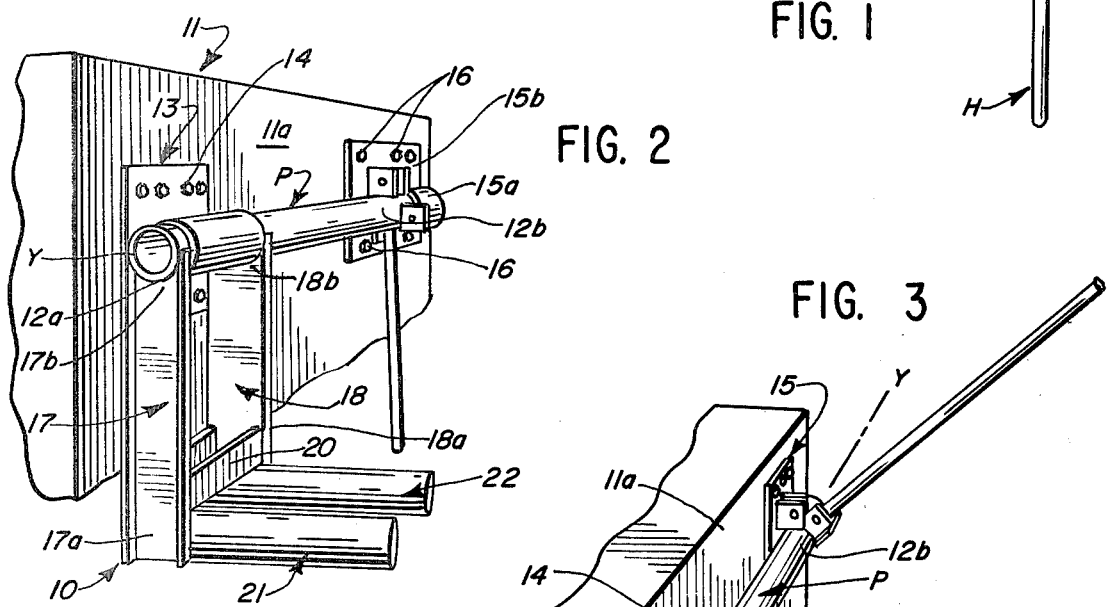
FIG. 2
FIG. 3
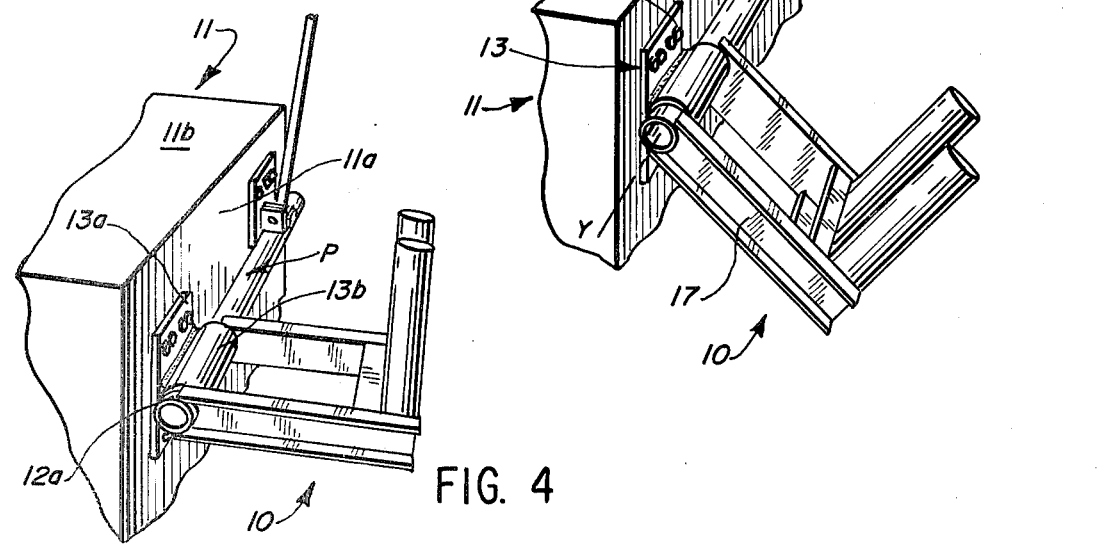
FIG. 4

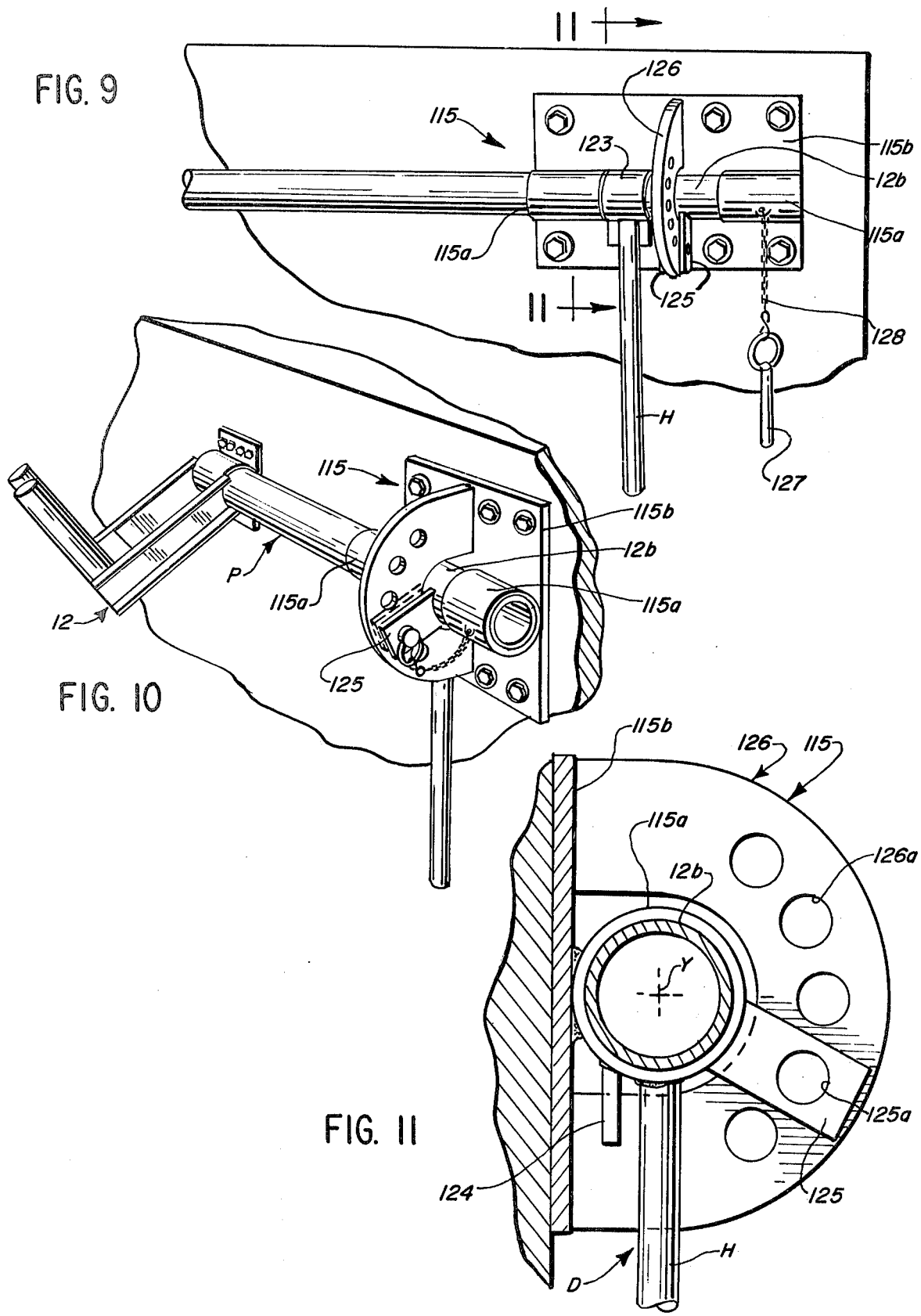

DEVICE FOR RELEASABLY SECURING A VEHICLE TO AN ADJACENT SUPPORT

BACKGROUND OF THE INVENTION

To avoid a potential hazard of a vehicle inadvertently and/or accidentally moving away from a loading dock during loading or unloading thereof, it has been customary in the past to utilize either a plurality of blocks which are wedged under certain wheels of the vehicle and in many instances are ineffective in restraining movement of the vehicle or to utilize a complex mechanism which is costly to install on a dock facility and frequently requires substantial structural modification thereof and oftentimes is awkward, difficult and time-consuming to engage and disengage from the vehicle parked at the dock.

SUMMARY OF THE INVENTION

Thus, it is an object of the invention to provide a device of the type described which avoids the aforenoted shortcomings associated with prior procedures and mechanisms utilized for such a purpose.

It is a further object of the invention to provide a device of the type described which is of simple, compact and inexpensive construction and requires no electrical, hydraulic or pneumatic power to operate.

It is a still further object of the invention to provide a device of the type described which may be readily attached to a variety of loading docks without interfering or obstructing the loading surface thereof and which is capable of accommodating vehicles of widely varying configurations.

It is a still further object of the invention to provide a device of the type described which is not adversely affected by severe climatic conditions.

It is a still further object of the invention to provide a device of the type described which is simple yet safe to operate and is capable of withstanding abusive treatment.

Further and additional objects will appear from the description, accompanying drawings and appended claims.

In accordance with one embodiment of the invention, a device of the type described is provided which may be readily attached to the front wall of a loading dock and disposed beneath the plane of the dock loading surface. The device comprises a hingedly mounted vehicle-engaging member and a pivotally mounted handle which is adapted to move the member from an inoperative mode to an operative mode. When in an operative mode, a portion of the member interlockingly engages a vehicle parked adjacent the loading dock and restrains the vehicle from moving away from the dock. When the member is in an inoperative mode, the portion of the member is in a vehicle-release position whereby the vehicle is free to move away from the loading dock. A means is carried on the member which is capable of locking same in an operative mode.

For a more complete understanding of the invention reference should be made to the drawings wherein:

FIG. 1 is a fragmentary front perspective view showing one form of the device mounted on the front wall of a conventional loading dock and having the vehicle-engaging member of the device disposed in a substantially inoperative mode.

FIG. 2 is an end perspective view of the device of FIG. 1.

FIG. 3 is similar to FIG. 2 but showing the member being moved by the handle from the inoperative mode towards the operative mode.

FIG. 4 is similar to FIG. 3 but showing the member disposed in an operative mode.

FIG. 9 is a fragmentary front perspective view of a modified form of a device-locking assembly.

FIG. 10 is a side perspective view of the modified device-locking assembly of FIG. 9 and showing the vehicle-engaging member retained in one operative mode.

FIG. 11 is an enlarged fragmentary sectional view taken along line 11—11 of FIG. 9 but showing the modified locking device in the operative mode of FIG. 10.

Figure 5:
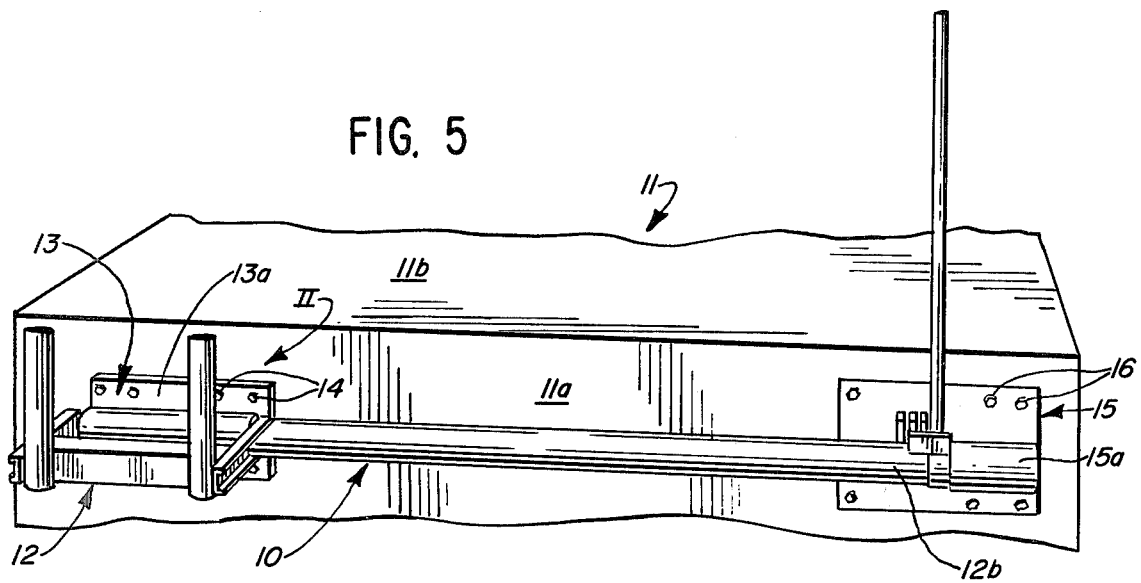
FIG. 5 is similar to FIG. 1 but showing the member disposed in an operative mode.

Referring now to the drawings and more particularly to FIGS. 1 and 5, a preferred form of the improved device 10 is shown attached to the front wall 11a of a conventional loading dock 11 and below the plane of the dock loading surface 11b. The device 10 includes a vehicle-engaging member or means 12 which is hingedly connected to the dock front surface 11a by a suitable bracket 13. The bracket embodies a base plate 13a, which overlies the surface 11a and is secured thereto by a plurality of anchor bolts 14. Secured by welding, or other suitable means, to the exposed surface of plate 13a is a sleeve bearing 13b which embraces a portion 12a of the member 12. The bearing 13b defines a horizontal hinge axis Y—Y for the member 12.

Extending laterally in a horizontal direction from one end of the sleeve bearing 13b is an elongated protruding portion 12b of the member 12. The end of the portion 12b is captured within a second sleeve bearing 15a which forms a part of a second bracket 15, the latter having a plate 15b secured to the dock front wall 11a by a plurality of anchor bolts 16. In the illustrated embodiment member portions 12a–12b comprise a unitary piece P, such as a section of pipe or rod. The bearings 13b, 15a are axially aligned with the hinge axis Y—Y.

Besides the pipe section P, the axis of which is horizontally disposed, is a pair of elongated frame sections 17, 18 and a cross bracing section 20. Sections 17, 18 are preferably in a spaced parallel relation and have the axes thereof disposed at right angles to the hinge axis Y—Y. The bracing section 20 maintains the distal end portions 17a, 18a of sections 17, 18 in proper spaced relation. The opposite, or inner, end portions 17b, 18b of the sections are affixed by welding, or other suitable means, to the exterior of the pipe section P. The spacing between end portions 17b, 18b defines the limits of member portion 12a and locks therebetween the bearing 13b of bracket 13; thereby, preventing, or limiting to an insignificant amount, axial shifting of the members 12 relative to the brackets 13, 15.

Affixed to and extending transversely from the section distal end portions 17a, 18a are stanchion-like sections 21, 22 the function of which will be described more fully hereinafter. The pipe section P, the elongated sections 17, 18, the bracing section 20 and the stanchion-like sections 21, 22 coact to form vehicle-engaging member 12 which is adapted to hinge about axis Y—Y between an inoperative mode I, see FIG. 1, and an operative mode II, see FIG. 5.

When member 12 is in inoperative mode I, sections 17, 18 assume a depending vertical position with regard to pipe section P and the stanchion-like sections 21, 22 protrude substantially horizontally, outwardly from the dock front wall 11a. The height of the device about the roadway on which the vehicle is parked (not shown) is such that the hinge axis Y—Y will be slightly below a lower cross member (not shown) comprising a component of a rear bumper, as required by the Interstate Commerce Commission on trucks and semitrailer trucks. Thus, when the member 12 is in the inoperative mode I, the outwardly protruding stanchion-like sections 21, 22 will be disposed beneath the truck bumper cross member and, thus, not interfere with the rear end of the truck or vehicle when the latter is being backed into a parked position with respect to the loading dock 11.

Once the truck or vehicle has assumed a proper position with respect to the dock so that the loading and unloading operation can subsequently commence, the member 12 is pivoted to an operative mode II, see FIG. 5, wherein the stanchion-like sections 21, 22 will move up behind the bumper cross member and capture, or interlock, same between the dock front wall 11a and the sections 21, 22. The lengths of sections 17, 18 may be of a fixed length as shown, or each of the sections 17, 18 may be formed of adjustable telescoping segments thereby enabling the device to accommodate all types of trucks. It is important that the spacing between the stanchion-like members 21, 22 be such that they fit between the rear wheels of the parked truck. Furthermore, the sections 21, 22 must have sufficient lengths that, when the member 12 is in the operative mode II, at least a portion of each section 21, 22 will engage the bumper cross member and thereby restrain the vehicle from moving away from the loading dock 11.

The member 12 may be readily moved from mode I to mode II by an elongated handle H. One end of the handle H is provided with a ringlike collar 23 which encompasses a segment of the protruding portion 12b which is adjacent one end of sleeve bearing 15a, see FIG. 6. Fixedly secure to collar 23 and projecting endwise therefrom is a tonguelike projection 24 which is adapted to engage a hasp, or lug, 25 carried by and extending radially from the exterior of the end portion 12b of the pipe section P when the handle H has been manually pivoted in a counterclockwise direction from its down position D through a sector of approximately 90°, see FIG. 7. Continued movement of the handle H in a counterclockwise direction, after contact has been made between the hasp 25 and the projection 24, will cause member 12 to move as a unit with the handle from an inoperative mode I to an operative mode II. When the member 12 has reached its operative mode II, the hasp 25 will be sandwiched between a pair of spaced, substantially parallel tonguelike lock elements 26 which project outwardly from the bracket plate 15b. The hasp 25 and the elements 26 are provided with openings 25a, 26a which are aligned with one another when the member is in the operative mode II and are adapted to accommodate a bail section 27a of a conventional padlock or the like 27 and, thus, effectively lock the member 12 in its operative mode. In lieu of the padlock 27, a dowel pin, not shown, may be inserted into the aligned openings. Once the padlock or dowel pin is in place, the handle H may be pivoted independently in a clockwise direction from its up position U (shown in phantom lines in FIG. 8) to its normal down position D.

Because of the length of pipe section P, the handle H and the associated mechanism will be disposed outwardly from the side of the parked vehicle or truck and, thus, the handle may be readily manipulated manually without interference.

Figure 6:
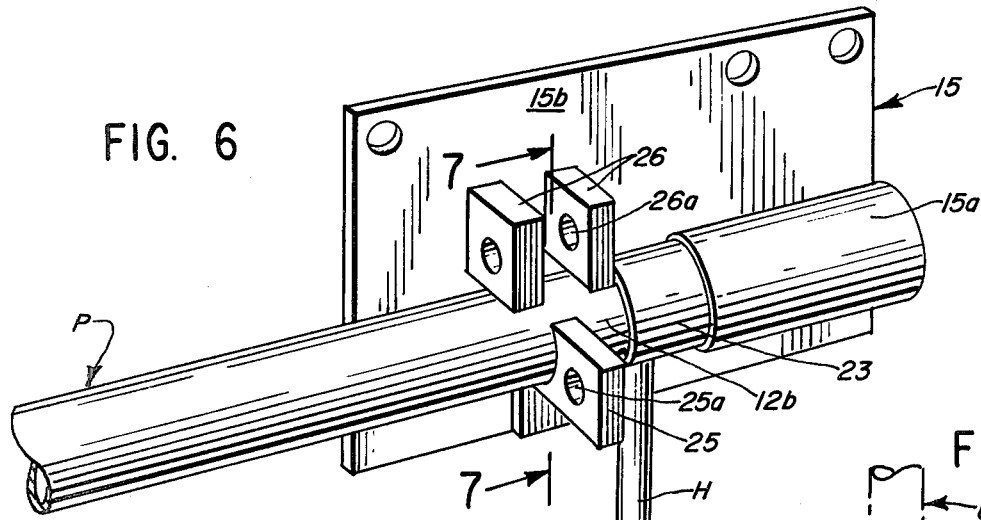
FIG. 6 is an enlarged fragmentary perspective view showing, in an unlocked condition, one form of device-locking assembly.
Figure 7:
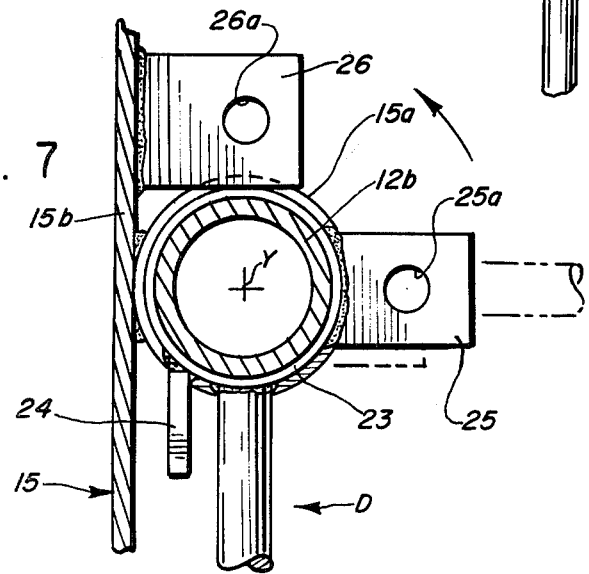
FIG. 7 is a sectional view taken along line 7—7 of FIG. 6.

A modified form of the device-locking assembly 115 is shown in FIGS. 9-11 which may be substituted for the assembly 15 shown in FIG. 6. To facilitate understanding of assembly 115, components thereof which are similar to those of assembly 15 will be identified by the same numerals but in the one hundred series.

In place of the pair of tonguelike elements 26, 26a of assembly 15, a single C-shaped element 126 is provided in assembly 115. The element 126 straddles the protruding portion 12b of the pipe section P and has the ends thereof welded or otherwise secured to the bracket plate 115b. Plate 115b is secured by suitable means to the dock front wall.

Sleevelike bearings 115a are affixed to and project outwardly from plate 115b and supportingly embrace segments of protruding portion 12b. The bearings 115a are axially aligned, but longitudinally spaced, relative to one another as seen more clearly in FIG. 9. Disposed between bearings 115a are the C-shaped element 126; the ringlike collar 123 to which one end of the handle H is connected; and a pair of hasps 125, the latter being affixed to and extending radially from the protruding pipe portion 12b. The hasps 125 are of like construction and are in axially spaced relation and disposed on opposite sides of the C-shaped element 126. Each hasp has an opening 125a formed therein which is adapted to be selectively aligned with one of a plurality of annually spaced openings 126a formed in element 126. Which opening 126a of element 126 is to be aligned with the openings 125a of the hasps 125 will depend upon the selected operative mode the vehicle-engaging member 12 is to assume. With the modified assembly 115, the vehicle-engaging member 12 may assume a plurality of operative modes, instead of just one, as seen in FIG. 5. By having a plurality of operative modes, the vehicle-engaging member can compensate for wide variations in the configurations and locations of the rear bumper mounted on the underside of the truck bed of the vehicle parked adjacent to the dock front wall. FIG. 10 shows the member 12 disposed in an operative mode wherein the lower cross member of the rear bumper is disposed a substantial distance beneath the truck bed.

Figure 8:
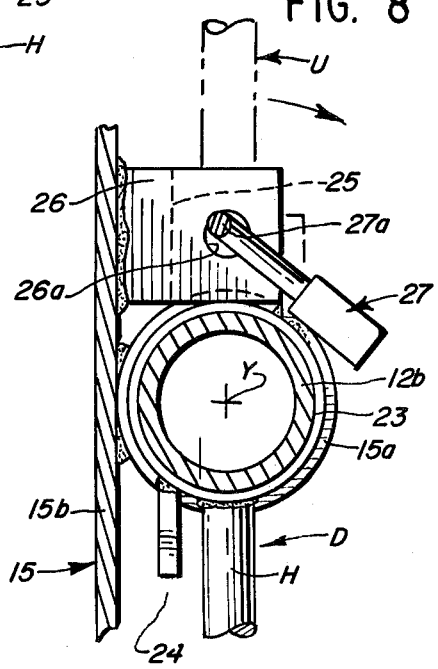
FIG. 8 is similar to FIG. 7 but showing the locking assembly in a locked condition; the position of the handle for moving the member into the operative mode is shown in phantom lines.

The member 12 is retained in the selected operative mode by a pin or dowel 127 which is permanently connected to bearing 115a by a section of chain 128. If it is desired to retain the member 12 in the selected operative mode for a prolonged period of time, a padlock 27, as shown in FIG. 8, may be substituted for the pin 127.

The handle H, the collar 123 therefor, and the tonguelike projection 124 function in the same manner as previously described with respect to assembly 15.

Thus, it will be seen that a simple, yet effective, device has been provided which will readily restrain a parked vehicle or truck from inadvertently or accidentally moving away from a loading dock while the vehicle or truck is being loaded or unloaded. The device may be easily secured to the front wall of a dock without modifying the dock structure. The device is of rugged construction, is readily operable even under the severest climatic conditions, and is capable of accommodating a wide variety of vehicle or truck styles.

We claim:

1. A device for releasably securing a parked vehicle against an adjacent structure and preventing accidental transverse movement of the vehicle away from the structure, said device comprising a first means mountable on the structure for hinged adjustment between an operative mode and an inoperative mode, said first means having an angularly extending distal portion spaced outwardly from the hinge axis and being adapted, when said first means is in an operative mode, to interlockingly engage an adjacent portion of the parked vehicle and position the adjacent portion of the vehicle between said distal portion and the hinge axis of the first means and substantially restrain transverse movement of the parked vehicle away from the adjacent structure and, when said first means is in an inoperative mode, being adapted to assume a vehicle-release position; and pivotally mounted second means operatively cooperating with said first means for effecting controlled hinged adjustment of the latter from said inoperative mode to said operative mode.

2. The device of claim 1 wherein said first means includes an attaching member fixedly mountable on the adjacent structure, an elongated inner section having a first segment hingedly connected to said attaching member and an outer section mounted on and extending transversely from a second segment of said inner section, said second segment being spaced from said first segment; said inner section assuming an outwardly projecting position and said outer section assuming an upwardly extending position when said first means is in said operative mode; said inner section assuming a depending position and said outer section an outwardly projecting position when said first means is in said inoperative mode.

3. The device of claim 2 wherein said second means includes an elongated handle mounted for pivotal movement independently of said first means about an axis substantially coaxial with the hinge axis of said first means; said handle, when moving through a predetermined sector of pivotal adjustment, drivingly engaging said first means and moving same from an inoperative mode to an operative mode.

4. The device of claim 3 wherein said first means includes means for locking said first means in said operative mode.

5. The device of claim 4 wherein the locking means of said first means includes a first lock element fixedly mounted on said first means and movable therewith, and a stationary complemental second lock element mounted on said attaching member and adapted to be lockingly engaged with said first element only when said first means assumes said operative mode.

6. The device of claim 5 wherein the complemental second lock element coacts with the attaching member and encompasses an elongated protuberance extending laterally from the first means and being substantially coaxial with the first means hinge axis; said second lock element being provided with a plurality of annularly spaced first components, a selected one of said first components being adapted to be lockingly engaged with a complemental second component provided on the first lock element when said first means assumes a selected operative mode.

7. A device for releasably securing a parked vehicle to an adjacent stationary surface, said device comprising a vehicle-engaging member mountable on the surface for adjustment about a hinge axis between an inoperative mode and a selected one of a plurality of operative modes, said vehicle-engaging member, when in a selected operative mode, being adapted to interlock with the vehicle and substantially restrain accidental transverse movement thereof away from the stationary surface, and when in an inoperative mode, being adapted to assume a vehicle-release position; and handle means operatively connected to said vehicle-engaging member for moving the latter from the inoperative mode to a selected operative mode, said vehicle-engaging member including means for locking said vehicle-engaging member in said selected operative modes, said locking means being provided with a first complemental lock element operatively connected to said vehicle-engaging member and movable therewith as a unit about said hinge axis, a fixedly mounted second complemental lock element disposed adjacent said first lock element; one of said complemental lock elements being provided with a plurality of lock stations arranged in spaced relation and forming a curvilinear row having a center of curvature substantially coincident to the hinge axis, each lock station being indicative of a selected operative mode, the other complemental lock element being provided with lock means coacting with a selected lock station to retain said vehicle-engaging means in a selected operative mode.

8. The device of claim 7 wherein the hinge axis is substantially horizontally disposed, and the second complemental lock element has a substantially C-shaped configuration and is disposed in a substantially straddling relation with an elongated portion of the vehicle-engaging member extending along the hinge axis; said first complemental lock element protruding outwardly from the elongated portion of the vehicle-engaging member and being provided with releasable means engageable with a selected lock station of said second complemental lock element.

9. The device of claim 8 wherein the lock stations comprise a plurality of apertures, and the first complemental lock is provided with an opening which is adapted to align with a selected aperture of said first complemental lock element when said vehicle-engaging means is disposed in a selected operative mode; said aligned aperture and opening having a removable element extending therethrough.

* * * * *